US009746582B1

(12) United States Patent
Zhou (10) Patent No.: US 9,746,582 B1
(45) Date of Patent: Aug. 29, 2017

(54) METHOD FOR IMPROVING PRECISION OF NEUTRON INDUCED GAMMA RAY SPECTROSCOPY

(71) Applicant: Schlumberger Technology Corporation, Sugar Land, TX (US)

(72) Inventor: Tong Zhou, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/134,669

(22) Filed: Apr. 21, 2016

(51) Int. Cl.
*G01V 5/10* (2006.01)

(52) U.S. Cl.
CPC .................................. *G01V 5/102* (2013.01)

(58) Field of Classification Search
CPC .............................. G01V 5/101; G01V 5/125
See application file for complete search history.

(56) References Cited

U.S. PATENT DOCUMENTS

| | | | | |
|---|---|---|---|---|
| 4,464,569 A | * | 8/1984 | Flaum | G01V 5/102 |
| | | | | 250/269.6 |
| 4,712,007 A | * | 12/1987 | Ondrik | G01V 5/105 |
| | | | | 250/256 |
| 5,600,135 A | * | 2/1997 | Jacobson | G01T 1/40 |
| | | | | 250/261 |
| 5,842,158 A | | 11/1998 | Plasek | |
| 2005/0272158 A1 | * | 12/2005 | Galford | G01N 24/08 |
| | | | | 436/29 |
| 2006/0091307 A1 | * | 5/2006 | Griffiths | G01V 5/045 |
| | | | | 250/262 |
| 2012/0059589 A1 | * | 3/2012 | Chace | G01V 5/101 |
| | | | | 702/8 |

OTHER PUBLICATIONS

Grau, et al. "Elemental Concentrations from Thermal Neutron Capture Gamma-ray Spectra in Geological Formations," Nucl Geophys. vol. 3, No. 1, pp. 1-9, 1989, Int. J. Radiat. Appl. Instrum. Part E.

* cited by examiner

Primary Examiner — Kiho Kim
(74) Attorney, Agent, or Firm — Michael Dae (57) ABSTRACT

A method for determining a composition of a formation, includes characterizing by energy detected gamma rays resulting from interaction of neutrons that irradiated the formation. Elemental yields are determined by spectrally analyzing the energy characterized gamma rays. A subset of the elemental yields is selected as background yields. The background yields are filtered. An apparent contribution of the filtered background yields to the characterized gamma rays is determined. Foreground elemental yields are determined by spectrally analyzing the characterized gamma rays having the apparent contribution removed.

19 Claims, 5 Drawing Sheets

METHOD FOR IMPROVING PRECISION OF NEUTRON INDUCED GAMMA RAY SPECTROSCOPY

CROSS-REFERENCE TO RELATED APPLICATIONS

Not Applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND

This disclosure is related to the field of neutron well logging measurements for determining petrophysical properties of subsurface formations traversed by a wellbore. More specifically, the disclosure relates to using neutron induced gamma ray spectroscopy to determine petrophysical parameters of such formations.

Various neutron based measurements have been used to evaluate characteristics of subsurface formations from a wellbore since at least the 1950s. Neutrons can interact with subsurface formations in different ways. They can be scattered elastically, which means kinetic energy and momentum are conserved; they can be scattered inelastically, which means certain nuclei go into an excited state while kinetic energy is lost; they can also be captured by a nucleus to form a new nucleus; it is also possible that the neutron interaction causes a nuclear reaction resulting in the emission of one or more nucleons from the target nucleus. The probability of a neutron interacting with a nucleus is measured by the respective interaction cross section, which is a function of many parameters, such as incident neutron energy, outgoing neutron energy (if a neutron emerges from the interaction), scattering angle, interaction type and interactive nucleus type, among others. Thus, neutrons can enable measurement of many different formation properties due to the variety and complexity of their interactions.

One wellbore neutron measurement analysis technique known in the art is neutron induced gamma ray spectroscopy. In such techniques, gamma rays that result from inelastic collision of high energy neutrons (approximately 1 million electron volts or more) with certain nuclei in the formations. The resulting gamma rays are spectrally characterized (i.e., counted with respect to energy thereof). The spectrally characterized gamma rays are analyzed with respect to characteristic energy of gamma rays emitted by inelastic collision with known elements (called "standard spectra"). The analyzed gamma ray spectrum may be used to determine fractional amounts of each of a plurality of specific chemical elements in the formations using standard spectra. A similar analysis technique may be performed using capture gamma rays, i.e., gamma rays emitted when neutrons at lower energy level such as epithermal or thermal energy are captured by specific atomic nuclei in the formations.

There are two substantial challenges in neutron-induced gamma ray spectroscopy used in well logging. One is precision of the relative factional amounts of each element (the "yields"), the other is the accuracy. Generally speaking, the more chemical elements for which yields are to be determined from a given set of spectrally characterized neutron induced gamma rays, better accuracy in calculating yields may be obtained. For an example, if in a spectral analysis the Barium standard spectrum is excluded from the analysis while there are barite-containing fluids in the wellbore, such exclusion will create biases on other calculated elemental yields. However, the more elements to be resolved by spectral analysis of induced gamma rays, worse statistical noise will result in the determined elemental yields. That is because any elemental standard spectrum somewhat correlates with other elemental standard spectra; thus in multiple elemental analysis more standard spectra used therein may result in more correlations which will amplify the statistical noise in the raw (measured) spectra. In this manner, the accuracy and precision are a trade-off.

SUMMARY

A method according to one aspect relates to a method for determining a composition of a formation includes characterizing by energy detected gamma rays resulting from interaction of neutrons that irradiated the formation. Elemental yields are determined by spectrally analyzing the energy characterized gamma rays. A subset of the elemental yields is selected as background yields. The background yields are filtered. An apparent contribution of the filtered background yields to the characterized gamma rays is determined. Foreground elemental yields are determined by spectrally analyzing the characterized gamma rays having the apparent contribution removed.

An apparatus for determining composition of a formation according to another aspect of the disclosure includes a neutron source, at least one gamma ray detector and a circuit for characterizing energy of gamma rays detected by the at least one gamma ray detector. The apparatus includes a processor configured to determine elemental yields by spectrally analyzing the energy-characterized gamma rays. The processor is configured to select a subset of the elemental yields as background yields. The processor is configured to filter the background yields and to estimate a gamma ray energy spectrum of the filtered background yields. The processor is configured to subtract the estimated gamma ray energy spectrum from the characterized energy of gamma rays. The processor is configured to determine foreground elemental yields from difference between the energy characterized gamma rays and the estimated gamma ray energy spectrum.

Other aspects and advantages will be apparent from the description and claims that follow.

DETAILED DESCRIPTION

Figure 1A:
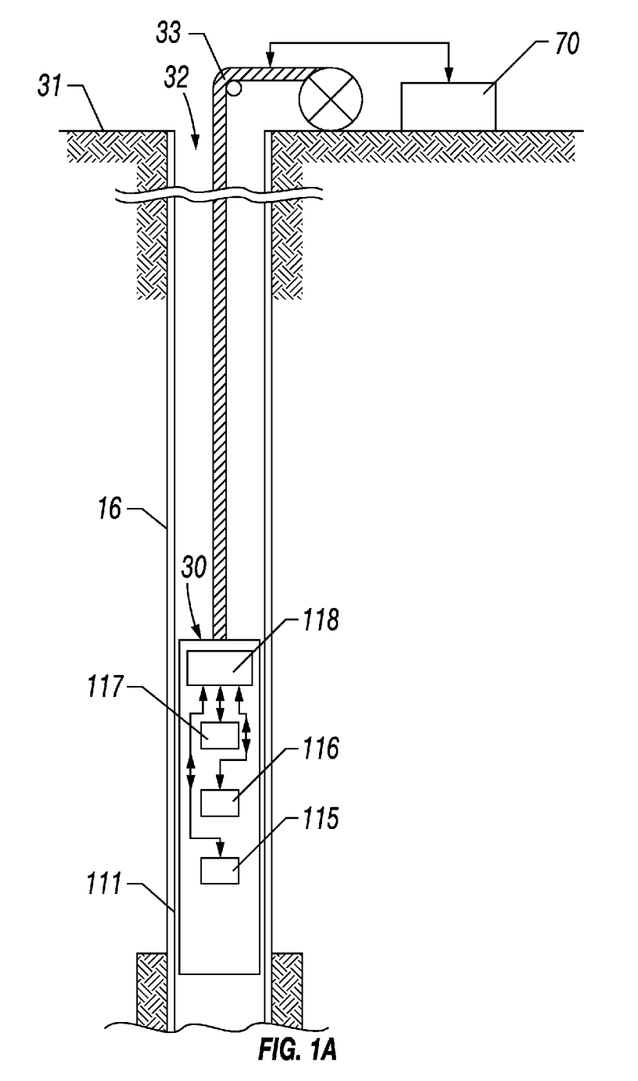
FIG. 1A shows an example well logging instrument conveyed through a wellbore by an electrical cable ("wireline").

FIG. 1A shows an example neutron well logging instrument 30. The measurement components of the instrument 30 may be disposed in a housing 111 shaped and sealed to be moved along the interior of a wellbore 32. The instrument housing 111 may contain at least one energy source 115, e.g., a neutron source such as electrically operated pulsed neutron source (hereinafter "source"), and one or more detectors 116, 117 each disposed at different axial spacings from the source 115. The source 115 may emit neutron radiation. Shielding (not shown) may be disposed in the housing 111 between the source 115 and the detectors 116, 117 to reduce direct transmission of neutrons from the source 115 to the detectors 116, 117. Thus, detected radiation may be characterized at each of a plurality of distances from the source 115, and thus have different lateral response (depth of investigation) into the formations surrounding the wellbore 32. In some example embodiments, two or more different types of well logging instruments, each having a different type of source and different types of corresponding detectors may be included in the same instrument assembly of "tool string." In other embodiments, only one detector may be used. In the present example embodiment, the detectors 116, 117 may be gamma ray detectors capable of generating a signal upon detection of gamma rays; and wherein a characteristic of each signal is related to the energy level of the detected gamma ray. Characterization of the energy level with reference to an aspect of the detected gamma ray, e.g., an amplitude thereof, may be performed by suitable circuitry 118 in the well logging instrument.

The instrument housing 111 may be coupled to an armored electrical cable 33 that may be extended into and retracted from the wellbore 32. The wellbore 32 may or may not include metal pipe or casing 16 therein. The cable 33 conducts electrical power to operate the instrument 30 from a surface 31 deployed recording system 70, and signals from the detectors 116, 117 may be processed by the circuitry 118 for transmission along the cable 33 to the recording system 70. The recording system 70 may include a processor, computer or computer system as will be explained below with reference to FIG. 1C for analysis of the detected signals as well as devices for recording the signals communicated along the cable 33 from the instrument 30 with respect to depth and/or time.

Various implementations of the well logging instrument described above can also be used, for example, in logging-while-drilling ("LWD") equipment. As shown, for example, in FIG. 1B, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. In some embodiments, the drill string 214 and drill bit 216 may be rotated from the surface by a "top drive" type of drilling rig.

Figure 1B:
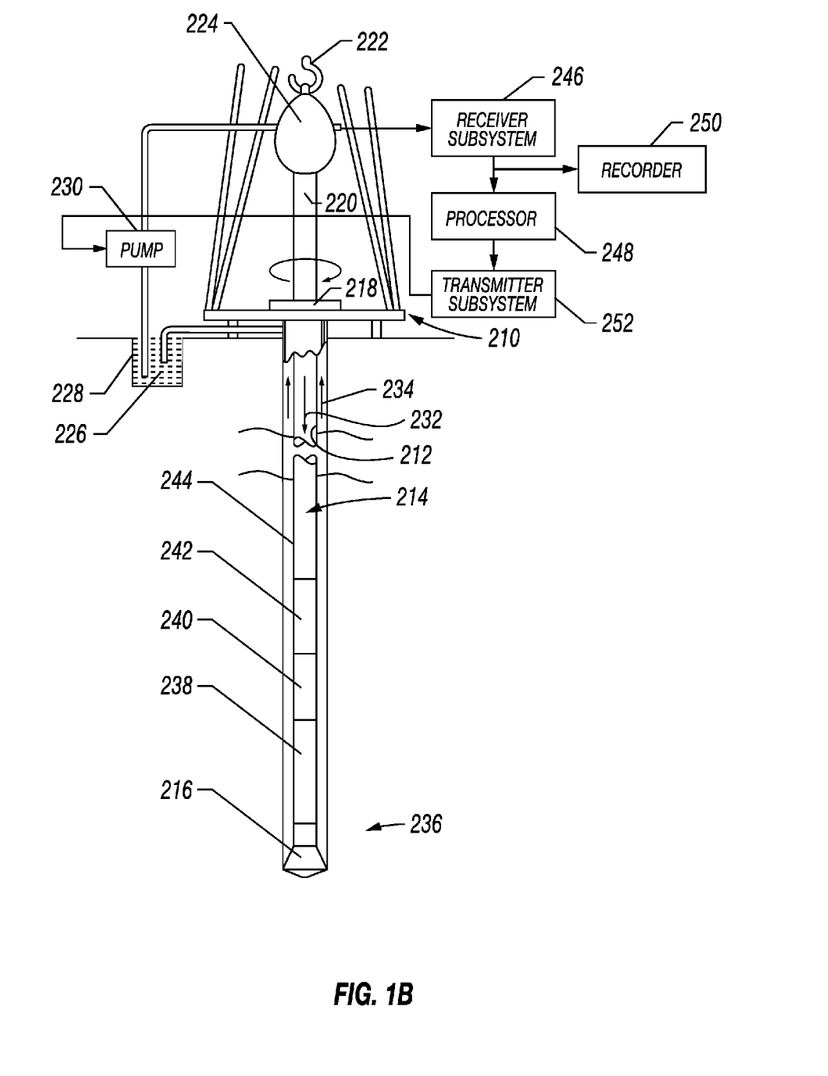
FIG. 1B shows an example logging while drilling instrument on a drill string.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, in some embodiments near the drill bit 216. The BHA 236 may include subassemblies for making measurements, processing and storing information and for communicating with the Earth's surface. Such measurements may correspond to those made using the instrument string explained above with reference to FIG. 1A. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions as well as on the demands of the measurement.

In the arrangement shown in FIG. 1B, the components of the well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 may also include conventional acquisition and processing electronics (not shown) comprising a microprocessor system (with associated memory, clock and timing circuitry, and interface circuitry) capable of timing the operation of the source and the data measuring sensors, storing data from the measuring sensors, processing the data and storing the results, and coupling any desired portion of the data to the telemetry components for transmission to the surface. The data may also be stored in the instrument and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

The foregoing computations may be performed on a computer system such as one shown in the processor at 248 in FIG. 1B, or in the surface unit 70 in FIG. 1A. However, any computer or computers may be used to equal effect.

Figure 1C:
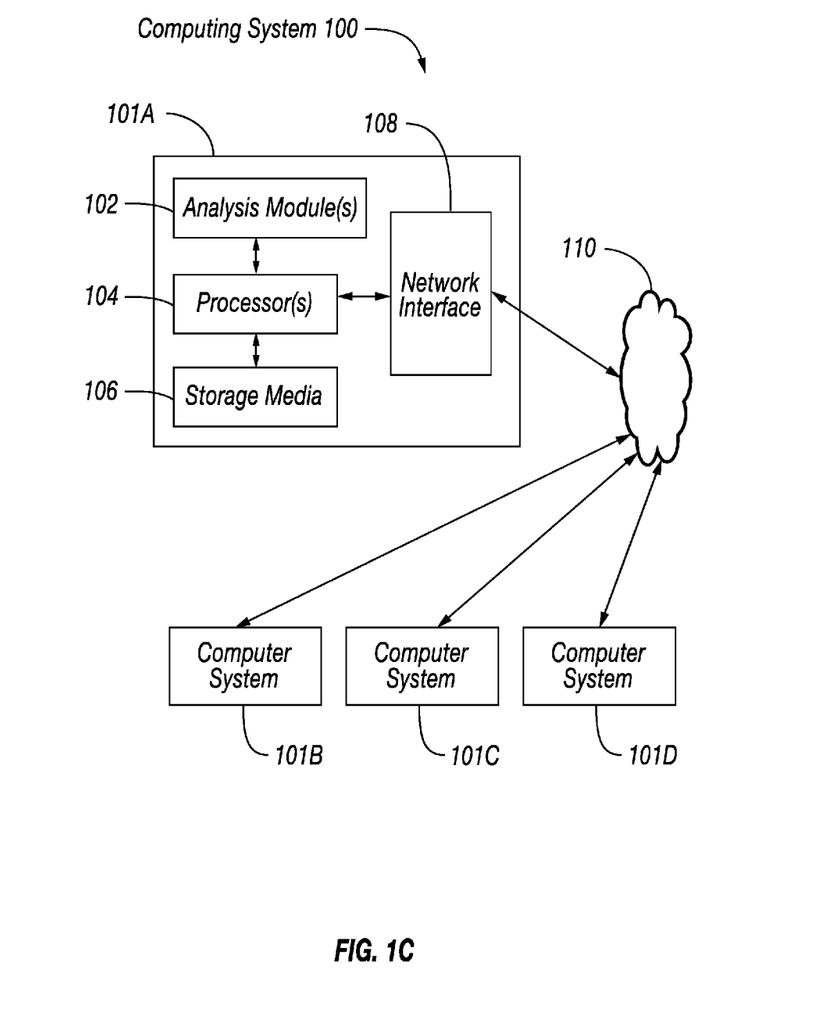
FIG. 1C shows an example computer system that may be used in some implementations.

FIG. 1C shows an example computing system 100 in accordance with some embodiments for carrying out example methods such as those to be explained below with reference to FIGS. 2 through 11. The computing system 100 can be an individual computer system 101A or an arrangement of distributed computer systems. The computer system 101A includes one or more analysis modules 102 that are configured to perform various tasks according to some embodiments, such as the tasks described above. To perform these various tasks, an analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, in a well logging unit disposed proximate a wellbore drilling, while in communication with one or more computer systems such as 101C and/or 101D that are located in one or more data centers on shore, other ships, and/or located in varying countries on different continents). Any one or more of the computer systems may be disposed in the well logging instrument (whether wireline as in FIG. 1A or LWD as in FIG. 1B).

A processor can include a microprocessor, microcontroller, processor module or subsystem, programmable integrated circuit, programmable gate array, digital signal processor (DSP), or another control or computing device.

The storage media 106 can be implemented as one or more non-transitory computer-readable or machine-readable storage media. Note that while in the embodiment of FIG. 1C storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or in some embodiments, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the embodiment of FIG. 1C, and/or computing system 100 may have a different configuration or arrangement of the components depicted in FIG. 1C. The various components shown in FIG. 1C may be implemented in hardware, software, or a combination of both hardware and software, including one or more signal processing and/or application specific integrated circuits.

Further, the steps in the methods described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of protection of the current disclosure.

Figure 1D:
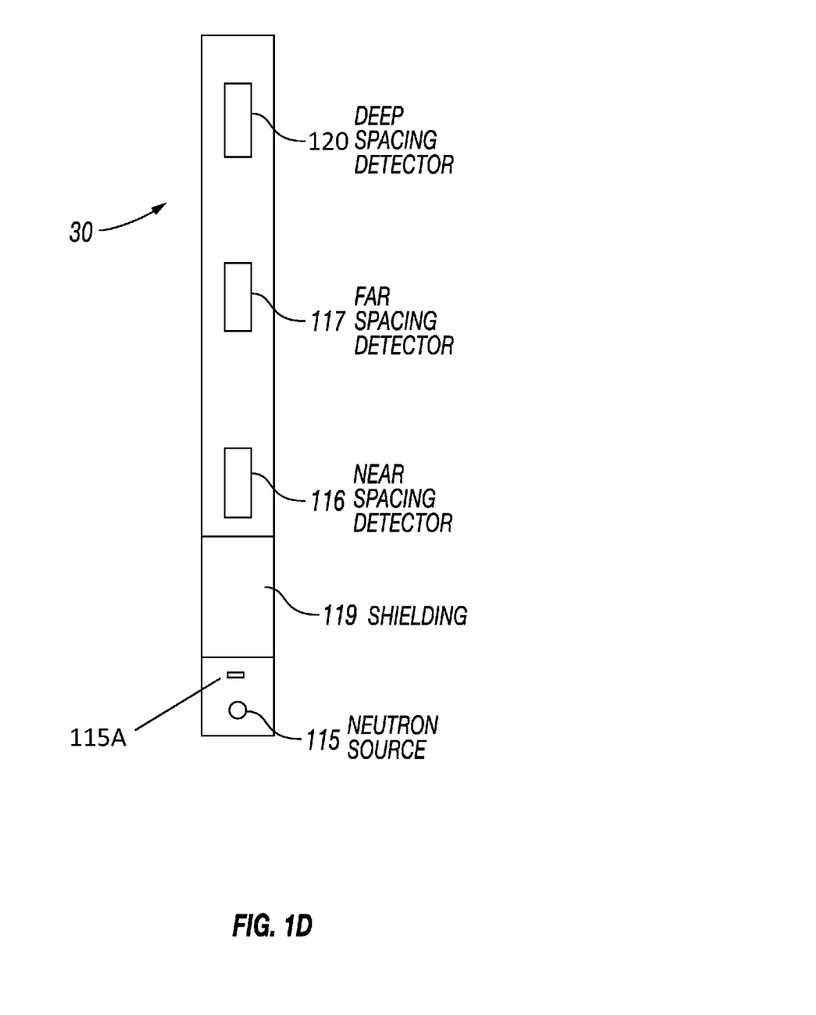
FIG. 1D shows a schematic representation of an example multiple detector neutron well logging instrument.

FIG. 1D shows a schematic cross section of an example neutron well logging instrument structure. Three detectors 116, 117, 120 at various longitudinal spacings from a neutron source 115, e.g., a pulsed neutron source as explained with reference to FIG. 1A, are shown. The source 115 may also be a radioisotope source such as $^{242}$Cf or $^{241}$AmBe. The type of neutron source is not intended to limit the scope of the present disclosure as long as the neutrons emitted therefrom result in gamma rays as a result of interaction between the emitted neutrons and nuclei of chemical elements in the formations surrounding the wellbore. The detectors 116, 117, 120 may each be a gamma ray detector such as a scintillation crystal optically coupled to a photomultiplier. Shielding 119 between the source 115 and the detectors 116, 117, 120, reduces or prevents the direct passage of radiation from the neutron source 115 to the detectors 116, 117 and 120. The source 115 (pulsed neutron generator) may be based on the deuterium-tritium reaction (with source energy of 14.1 MeV, the deuterium-deuterium reaction (with a source energy of about 2.45 MeV) or any other suitable reaction wherein the energy of the emitted neutrons exceeds 1 MeV. Methods according to the present disclosure may be applied to any form of neutron logging tools with the above described detector and/or neutron source options. Although the example instrument shown in FIG. 1D has three longitudinally spaced apart detectors 116, 117, 120, for purposes of methods according to the present disclosure only one or two such detectors may be used.

The neutron source 115, when it is on and generating neutrons, will emit high energy neutrons (typically 14 MeV) monochromatically; the energy of the neutrons generated will depend on the particular nuclear reaction use in the pulsed neutron generator. The detectors 116, 117, 120 will detect gamma rays arriving at each detector with respect to time. The gamma rays are generated as a result of interaction of the emitted neutrons with materials in the wellbore and in the surrounding formations. There are two mechanisms through which a neutron-induced gamma rays can be generated. One mechanism is neutron inelastic scattering, which can be triggered only by "fast" neutrons (neutrons having energy above approximately 1 MeV; the exact energy threshold depends on the type of nucleus). The other mechanism for generating neutron induced gamma rays is neutron capture by susceptible nuclei, which can be triggered primarily by thermal neutrons (with energy below around 0.4 eV) or epi-thermal neutrons (with energy from 1 to 100 eV). In embodiments in which the source 115 is electrically operated, when the source 115 is switched on, the gamma rays arriving at the detectors can result from both mechanisms because the source keeps emitting fast neutrons which can inelastically collide with nuclei in the wellbore and surrounding formations as well as slow down to epi-thermal or thermal energy almost instantly ("instantly" in the present context meaning relative to the acquisition system timing). When the source 115 is off, the gamma rays arriving at the detectors can only result from epi-thermal or thermal neutron capture because of the instantaneous reduction of neutron energy by nuclear collision. In the present example embodiment, numbers of radiation events detected by the detectors 116, 117, 120 may be normalized for variations in the neutron output of the source 115 by using measurements of neutrons emitted from the source 115, e.g., using a neutron detector 115A disposed inside the instrument 30 proximate the source 115.

As previously explained, while the various embodiments of a neutron induced gamma ray spectroscopy well logging instrument described with reference to FIGS. 1A, 1B and 1D include more than one detector, in other embodiments, the well logging instrument may comprise only one detector. Having explained instruments that may be used to make measurements to implement methods according to the present disclosure, example embodiments of such methods will now be explained.

Expressed in its most general terms, methods according to the present disclosure may use numbers of detected gamma rays characterized according to their energy to determine chemical composition (i.e., relative elemental yields) of the formations surrounding the wellbore. Such determination may be performed in a manner intended to improve the statistical noise in the calculated relative chemical elemental yields, while still keeping the accuracy by using the possible elemental standard spectra in the spectral analysis of the energy-characterized detected gamma rays. After solving the elemental relative yields in a first pass spectral analysis, it is possible to select a set of elements' relative yields and apply a long filter or an adaptive filter to such set to improve the precision. The selected yields may be, for example, the contribution from the well logging instrument itself, elements known only to exist in the wellbore but not in the surrounding formation, or that may exist largely in the wellbore, or elements whose spectral analysis is characteristically excessively noisy. After the filtering the foregoing relative yields from the spectral analysis, the precision of the remaining selected elemental relative yields may be substantially improved. Then it is possible remove the spectral contribution of the selected relative yields from the total measured gamma ray spectrum and then spectrally analyze the measured spectrum after filtering out therefrom the contribution of the selected elements to thus resolve the unselected elemental relative yields. The unselected elemental relative yields are the measurements for which yields are sought, and the present method may improve the precision of their calculation without introducing biases.

Figure 2:
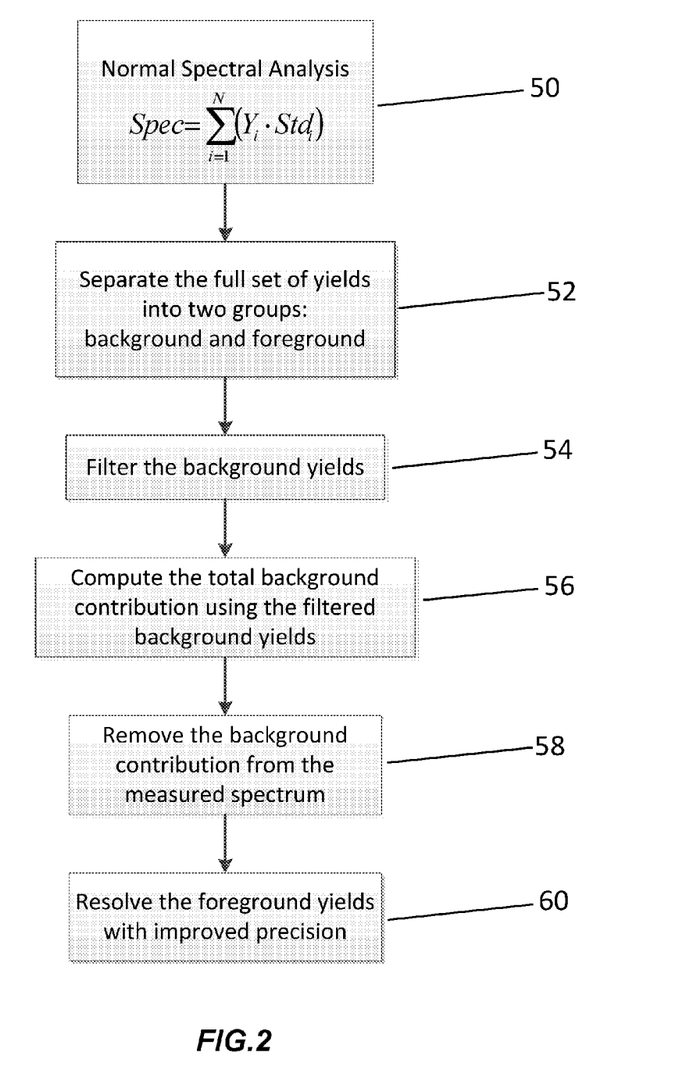
FIG. 2 is a flow chart of an example embodiment of a method according to the present disclosure.

Example embodiments of the present method may be applied to neutron-induced gamma ray spectral analysis known in the art after such analysis is complete. Referring to FIG. 2, at 50, spectral analysis known in the art may be performed on the total measured gamma ray spectrum at each depth level or time interval for which gamma ray data are to be characterized. It will be appreciated by those skilled in the art that cable conveyed instruments such as shown in FIG. 1A may have gamma ray data accumulated for selected measured depth intervals, such as ¼ foot (3 inches). LWD implementations such as shown in FIG. 1B may have gamma ray data accumulated for selected time intervals such as one second. One embodiment of spectral represented by the linear model shown below:

$$Spec = \sum_{i=1}^{N}(Y_i \cdot Std_i) \quad (1)$$

where Spec is the corrected measured gamma ray spectrum. The corrected measured gamma ray spectrum may be a net capture gamma ray or a net inelastic gamma ray spectrum. Correction includes detector pileup correction, background gamma ray subtraction, gain, offset and non-linearity corrections. $Y_i$ is the elemental relative yield for the $i^{th}$ chemical element. $Y_i$ can also be a relative yield to account for the contribution from instrument itself or detector itself, or residual epi-thermal neutron capture gamma rays from the detector included in the net inelastic gamma ray spectrum. N is the total number of chemical elements to be identified by the spectral analysis. $Std_i$ is the elemental standard gamma ray spectrum (inelastic and/or capture gamma ray) for the $i^{th}$ element after proper degradation to match the instrument detector response. The degradation may include resolution degradation and non-Gaussian shape degradation.

After solving Eq. 1, the result is a set of yields $Y_i$ for each of the N elements of the spectral analysis. In order to improve the statistical noise in certain yields, at 52 in FIG. 2, the yields $Y_i$ may be separated into two groups, one being referred to as "background yields" (called M1) and the other being referred to as "foreground yields" (called M2). The sum of M1 and M2 is the full set of yields for all N elements.

In some embodiments, a method according to the present disclosure is used to improve the precision of the foreground yields. At 54 in FIG. 2, the background yields M1 may be filtered using any of a number of filtering techniques. Various example filtering methods are described further below. After filtering, the background yields M1, the total contribution of the background yields M1 to the measured spectrum Spec may be calculated, at 56 and characterized as a background yield spectrum Spec_bg.

$$Spec\_bg = \sum_{i1=1}^{M1}(Yf_{i1} \cdot Std_{i1}) \quad (2)$$

Where $Yf_{i1}$ are the background yields after filtering, and $Std_{i1}$ is the elemental standard spectrum for each of the background elements.

The background yield spectrum Spec_bg may then be subtracted, at 58, from the measured net gamma ray spectrum to determine a foreground element gamma ray spectrum. At 60, the foreground elemental yields may be determined from the foreground element gamma ray spectrum using the linear model shown in Eq. (3):

$$Spec - Spec\_bg = \sum_{i2=1}^{M2}(Y_{i2} \cdot Std_{i2}) \quad (3)$$

Where $Yf_{i2}$ are the foreground yields and $Std_{i2}$ are the standard spectra for each of the foreground elements.

The foregoing method can be applied to both capture gamma ray and inelastic neutron induced gamma ray spectroscopy measurements.

In one example implementation, inelastic gamma ray yields desired in particular for analysis may be carbon and oxygen. In such example embodiment other inelastic yields may be defined as background yields and the only foreground yields are carbon and oxygen. After filtering the background yields and resolving the foreground yields from the background corrected total gamma ray spectrum, a factor of 2 improvement in the precision of carbon and oxygen ratio measurement was demonstrated in testing the present example embodiment. Such improvement is equivalent to 4 times improvement in the possible speed of movement of the well logging instrument (see FIG. 1), which has in the past been a limitation for carbon/oxygen logging. Further study shows such an improvement largely results from filtering the yield corresponding to the inelastic gamma rays generated from the instrument itself (referred as inelastic tool background). That is because the standard spectrum for the inelastic tool background has few gamma ray energy peaks, and has relatively high correlation between most of other inelastic elemental standards. Thus, by filtering and removing the inelastic tool background, it is possible to improve the precision of the other more (e.g., carbon and oxygen) inelastic elemental yields.

The same method may also be applied to capture gamma ray spectroscopy for lithology measurement. Not all capture gamma ray yields are used for lithology measurement. For example, capture instrument background (neutron capture gamma rays generated by the tool itself), differential hydrogen, differential chlorine, gadolinium, and a few others are often not used for lithology measurement. One can choose to filter them and improve the precision of the other capture elemental yields.

Generally speaking, if any two neutron induced standard gamma ray spectra are highly correlated (i.e. the spectra shape is very similar), the statistical noise will be amplified by solving both of them. Thus, when selecting which elemental or lithological spectra to include in the background yields, the results may be improved by selecting spectra which are highly correlated with the foreground yields. One way to quantify the correlation between two standard spectra is to use the correlation coefficient, defined as Eq (5). $r_{xy}$ is the correlation coefficient between x and y, which are the two standard spectra. n is the total number of channels of the spectrum. $x_i$ is the $i^{th}$ channel of spectrum x, $y_i$ is the $i^{th}$ channel of spectrum y. The correlation coefficient equal to zero means no correlation at all, equal to 1 means 100% the two are 100% correlated, equal to −1 means 100% anti-correlated.

$$r_{xy} = \frac{n\sum x_i y_i - \sum x_i \sum y_i}{\sqrt{n\sum x_i^2 - (\sum x_i)^2}\sqrt{n\sum y_i^2 - (\sum y_i)^2}}. \tag{5}$$

In one example embodiment, a correlation coefficient $r_{xy}$ exceeding, for example, 50% (0.50) may be considered "highly correlated" for purposes of determining whether a background spectrum is sufficiently correlated with one or more foreground spectra. There are numerous filter techniques available and can be used in this method.

The most basic filter technique is a simple depth filter with a fixed number of depth levels for well log data that are recorded or processed into in same size depth increments. This is known as a boxcar filter.

One can specify different weight for different depth levels within a selected number of depth levels when using the boxcar filter.

Other more complex filtering technique includes polynomial filter, Gaussian filter or filters with other functions. On example of a polynomial filter is called the Savitzky-Golay filter.

One can also dynamically determine the number of levels to be filtered with a boxcar filter at each depth level. This method is called adaptive filtering. Ronald E. Plasek, "Method for adaptive filtering of well logging data", U.S. Pat. No. 5,842,158 provides a good example of dynamically adjusted boxcar filtering, in which the filter length at each level is determined based on a Chi-square statistical test. Other statistical tests can also be used to determine the filter length dynamically.

The filter length can also be determined dynamically by using other measurements, including but not limited to compensated formation sigma (thermal neutron capture cross-section), apparent sigma for the particular subsurface formation, apparent sigma for the wellbore, compensated wellbore sigma, formation neutron porosity, capture gamma ray ratio from two gamma ray detectors where such instruments are used, e.g., see FIG. 1, and certain relative yields.

Some background yields have strong dependency on environmental conditions. For example, the inelastic tool background may depend strongly on the formation porosity; the capture tool background depends on the formation sigma and porosity; the capture borehole chlorine depends on the formation sigma; and so on. Ideally, when filtering the background yields, results are improved if they have a constant mean value, and only the statistical noise is to be filtered. As a practical matter, however, the background yields will vary depending on the formation conditions (sigma or porosity) with statistical noises superimposed. Therefore, filtering will not only reduce the statistical noises, but may also affect the formation responses which may cause some biases when solving the foreground yields. There is a way to overcome this limitation. One can characterize the formation response of the background yields based on other available measurements, such as apparent sigma, compensated formation sigma (thermal neutron capture cross-section), the capture gamma ray raw count rate ratio between two detectors (e.g., when using an instrument such as shown in FIG. 1A or 1D), the compensated formation neutron porosity, among other parameters. Typically, those measurements have a lot smaller statistical noise than the background yields. Thus, one can use those measurements to predict the background yields' formation response, and leave a borehole response, as shown in Eq. (4). As a practical matter, the borehole condition is typically the same over the entire well logging measurement interval, or within a certain section thereof. Then one can only filter the borehole component, which is the difference between the raw background yield and the predicted formation component, and then add the filtered borehole component back to the predicted formation component. In this way, the filter only improves the statistical noise and does not change the formation response.

$$\text{background\_yield} = f_{formation}(\text{sigma}, \text{porosity}) +$$

$$f_{borehole}(\text{hole\_size}, \text{borehole\_fluid}, \text{casing} \ldots) \tag{4}$$

In some embodiments, the methods, apparatus, or systems of the current disclosure are applicable in the context of one or more predictive frameworks such as an artificial neural network (ANN). Stated in simple terms, neural networks are pattern recognition tools that make use of parallel connections of simple functions. When implemented properly, neural network technology may improve the match between various wellbore log data.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

What is claimed is:

1. A method for determining a composition of a subsurface formation, comprising:
   characterizing by energy detected gamma rays resulting from interaction of neutrons that have been generated from a chemical isotope source or an electrically operated neutron source and have irradiated the formation, the detection performed at at least one spaced apart position from a position of the irradiation;
   determining elemental yields by spectrally analyzing the energy characterized gamma rays;
   selecting a subset of the elemental yields as background yields and filtering the background yields;
   calculating an apparent contribution of the filtered background yields to the characterized gamma rays;
   determining foreground elemental yields of the formation by spectrally analyzing the characterized gamma rays having the apparent contribution removed;
   wherein the spectrally analyzing comprises determining a sum of products of elemental yields for a plurality of elements with a standard gamma ray spectrum for each of the plurality of elements.

2. The method of claim 1 wherein the filtering comprises at least one of boxcar filtering, polynomial filtering and Gaussian filtering.

3. The method of claim 2 wherein the boxcar filtering comprises adaptive filtering.

4. The method of claim 1 wherein the detected gamma rays comprise capture gamma rays.

5. The method of claim 1 wherein the detected gamma rays comprise inelastic scattered gamma rays.

6. The method of claim 1 wherein the determining the apparent contribution comprises determining a sum of products of each filtered background yield with a respective standard spectrum for each background yield element.

7. The method of claim 1 further comprising adjusting the filtered background yields using measurements of at least one of apparent formation sigma, compensated formation sigma, capture gamma ray raw ratio between two detectors and compensated formation neutron porosity.

8. The method of claim 1 wherein at least one of the subset is selected by comparing a correlation coefficient of a corresponding standard spectrum to at least one of a plurality of standard spectra of foreground yields.

9. The method of claim 8 wherein the at least one of the subset is selected when the correlation coefficient exceeds 0.50.

10. An apparatus for determining composition of a matter, comprising:
    a neutron source;
    at least one gamma ray detector;
    a circuit for characterizing energy of gamma rays detected by the at least one gamma ray detector; and
    a processor configured to determine elemental yields by spectrally analyzing the energy-characterized gamma rays, the processor configured to selected a subset of the elemental yields as background yields, the processor configured to filter the background yields, the processor configured to estimate a gamma ray energy spectrum of the filtered background yields and subtract the gamma ray energy spectrum from the characterized energy of gamma rays, the processor configured to determine foreground elemental yields from difference between the energy characterized gamma rays and the estimated gamma ray energy spectrum;
    wherein the processor is further configured to adjust the filtered background yields using measurements of at least one of apparent formation sigma, compensated formation sigma, capture gamma ray raw ratio between two detectors and compensated formation neutron porosity.

11. The apparatus of claim 10 wherein the filter comprises at least one of a boxcar filter, a polynomial filter and a Gaussian filter.

12. The apparatus of claim 11 wherein the boxcar filter comprises an adaptive filter.

13. The apparatus of claim 10 wherein the neutron source a chemical isotope source.

14. The apparatus of claim 10 wherein the neutron source comprises an electrically operated neutron source.

15. The apparatus of claim 10 wherein the processor is further configured to select the at least one of the subset by comparing a correlation coefficient of a corresponding standard spectrum to at least one of a plurality of standard spectra of foreground yields.

16. The apparatus of claim 15 wherein the processor is further configured to select the at least one of the subset when the correlation coefficient exceeds 0.50.

17. A method for determining a composition of a subsurface formation, comprising:
    characterizing by energy detected gamma rays resulting from interaction of neutrons that have been generated from a chemical isotope source or an electrically operated neutron source and have irradiated the formation, the detection performed at at least one spaced apart position from a position of the irradiation;
    determining elemental yields by spectrally analyzing the energy characterized gamma rays;
    selecting a subset of the elemental yields as background yields and filtering the background yields;
    calculating an apparent contribution of the filtered background yields to the characterized gamma rays by determining a sum of products of each filtered background yield with a respective standard spectrum for each background yield element;
    determining foreground elemental yields of the formation by spectrally analyzing the characterized gamma rays having the apparent contribution removed.

18. A method for determining a composition of a subsurface formation, comprising:
    characterizing by energy detected gamma rays resulting from interaction of neutrons that have been generated from a chemical isotope source or an electrically operated neutron source and have irradiated the formation, the detection performed at at least one spaced apart position from a position of the irradiation;
    determining elemental yields by spectrally analyzing the energy characterized gamma rays;
    selecting a subset of the elemental yields as background yields and filtering the background yields;
    calculating an apparent contribution of the filtered background yields to the characterized gamma rays;
    determining foreground elemental yields of the formation by spectrally analyzing the characterized gamma rays having the apparent contribution removed;

wherein at least one of the subset is selected by comparing a correlation coefficient of a corresponding standard spectrum to at least one of a plurality of standard spectra of foreground yields.

19. The method of claim 18 wherein the at least one of the subset is selected when the correlation coefficient exceeds 0.50.

\* \* \* \* \*